US009671066B2

(12) United States Patent
Veenstra

(10) Patent No.: US 9,671,066 B2
(45) Date of Patent: Jun. 6, 2017

(54) TANK ASSEMBLY COLLAR MOUNT

(75) Inventor: Michael Jon Veenstra, Southgate, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 2231 days.

(21) Appl. No.: 12/609,366

(22) Filed: Oct. 30, 2009

(65) Prior Publication Data

US 2011/0101001 A1  May 5, 2011

(51) Int. Cl.
*F17C 1/16* (2006.01)

(52) U.S. Cl.
CPC ........ *F17C 1/16* (2013.01); *F17C 2203/0604* (2013.01); *F17C 2203/066* (2013.01); *F17C 2203/0619* (2013.01); *F17C 2203/0636* (2013.01); *F17C 2203/0646* (2013.01); *F17C 2203/0673* (2013.01); *F17C 2205/0305* (2013.01); *F17C 2205/037* (2013.01); *F17C 2205/0323* (2013.01); *F17C 2205/0338* (2013.01); *F17C 2205/0394* (2013.01); *F17C 2209/2154* (2013.01); *F17C 2209/228* (2013.01); *F17C 2209/234* (2013.01); *F17C 2221/012* (2013.01); *F17C 2223/0123* (2013.01); *F17C 2223/035* (2013.01); *F17C 2223/036* (2013.01); *F17C 2260/013* (2013.01); *F17C 2260/036* (2013.01); *F17C 2270/0105* (2013.01); *F17C 2270/0171* (2013.01); *F17C 2270/0173* (2013.01); *F17C 2270/0176* (2013.01); *F17C 2270/0178* (2013.01); *F17C 2270/0189* (2013.01); *F17C 2270/0194* (2013.01); *Y02E 60/321* (2013.01)

(58) Field of Classification Search
USPC .................................. 220/581, 582
See application file for complete search history.

(56) References Cited

U.S. PATENT DOCUMENTS

| | | | | |
|---|---|---|---|---|
| 3,137,405 | A * | 6/1964 | Gorcey | 220/590 |
| 3,907,149 | A * | 9/1975 | Harmon | 220/590 |
| 5,388,720 | A * | 2/1995 | Murphy | 220/581 |
| 5,535,912 | A * | 7/1996 | Fritz et al. | 220/586 |
| 5,839,600 | A * | 11/1998 | Moreira et al. | 220/560.04 |
| 6,041,762 | A | 3/2000 | Sirosh et al. | |
| 6,089,399 | A * | 7/2000 | Felbaum et al. | 220/582 |
| 6,186,356 | B1 * | 2/2001 | Berkley et al. | 220/582 |
| 6,193,917 | B1 * | 2/2001 | DeLay | 264/46.7 |
| 6,230,922 | B1 * | 5/2001 | Rasche et al. | 220/586 |
| 6,675,831 | B2 | 1/2004 | Sakaguchi et al. | |
| 7,270,209 | B2 | 9/2007 | Süess | |
| 7,278,401 | B1 | 10/2007 | Cotton et al. | |
| 2004/0182869 | A1 * | 9/2004 | Kubo et al. | 220/581 |
| 2004/0206762 | A1 * | 10/2004 | Iida et al. | 220/581 |
| 2007/0012551 | A1 | 1/2007 | Rohwer et al. | |
| 2007/0056643 | A1 | 3/2007 | Larsen et al. | |

* cited by examiner

*Primary Examiner* — Fenn Mathew
(74) *Attorney, Agent, or Firm* — Brooks Kushman P.C.; Damian Porcari

(57) ABSTRACT

A tank assembly having a gas impermeable liner having a neck for storing a compressed gas is provided. The neck has a threaded bore. An annular collar having a generally circular opening is disposed around the neck. A structural layer substantially envelopes the liner and secures the collar to the neck.

16 Claims, 4 Drawing Sheets

TANK ASSEMBLY COLLAR MOUNT

BACKGROUND

1. Technical Field

Embodiments of the present invention include a tank assembly for storing a compressed gas. The tank assembly includes a collar assembled thereto to facilitate the mounting of bodies to the tank assembly.

2. Background Art

Tanks for storing compressed gas are well known. Conventional tanks are capable of storing compressed gas at very high pressures. For example, hydrogen may be stored in tank assemblies at pressures of up to 10,000 psi, and beyond. However, the systems that use compressed gases, such as an internal combustion engine and fuel cells, typically operate at far lower pressures. Accordingly, the compressed gas stored in the tank assembly must first pass through a regulator or some other mechanism which reduces the pressure of the stored gas before it can be utilized. Conventional tank assemblies do not include a mount for regulators. Accordingly, systems utilizing a conventional tank assembly position the regulator remotely from the valve. Positioning the regulator remotely from the valve has many disadvantages including, but not limited to, the added cost associated with using a high pressure hose/line to contain the high pressure compressed gas outside of the tank assembly prior to passing through the regulator. Additionally, the wear and tear associated with maintaining a high pressure compressed gas in a hose/line is greater than the wear and tear associated with maintaining gas at lower pressures. These and other disadvantages increase as the distance between the regulator and the tank assembly's valve increases.

Prior solutions to this problem have involved mounting devices such as regulators directly to the valve of the tank assembly. Such devices, however, frequently have a good deal of mass. The valve of a tank assembly may not be sufficiently robust to tolerate the forces acting on the valve and the devices during normal equipment operations.

SUMMARY

Various embodiments of a tank assembly are disclosed herein. In a first embodiment, the tank assembly comprises the gas impermeable liner having a neck having a threaded bore. An annular collar having a generally circular opening is disposed around the neck. A structural layer substantially envelopes the liner and secures the annular collar to the neck.

In an implementation of the first embodiment, the annular collar includes a raised annular flange. In a variation of this implementation, the raised annular flange defines a plurality of mounting bores. In a further variation, the plurality of mounting bores are threaded.

In another implementation of the first embodiment, the annular collar includes a generally circular channel defined in a surface of the collar. The channel is generally concentric with the generally circular opening of the annular collar. In a variation of this implementation, the annular collar further includes a raised annular flange disposed concentrically with the channel. In a further variation, the raised annular flange has a smaller diameter than the channel. In a further variation, the raised annular flange defines a plurality of threaded mounting bores disposed about the raised annular flange.

In another implementation of the first embodiment, the liner comprises metal.

In a second embodiment, a tank assembly comprises a gas impermeable liner having a neck. An annular collar having a generally circular opening, a first surface, and an annular flange protruding above the first surface and disposed generally concentrically with the opening, is disposed around the neck such that the first surface is substantially coplanar with an upper surface of the neck. A structural layer substantially envelopes the liner and secures the collar to the neck.

In an implementation of the second embodiment, a surface of the annular collar defines a generally circular channel disposed generally concentrically with the opening. The channel has a larger diameter than a diameter of the annular flange.

In another implementation of the second embodiment, the annular flange defines mounting bores. In a variation of this implementation, the mounting bores are disposed about the annular flange such that each mounting bore is substantially equidistant from each adjacent mounting bore. In another variation, a surface of the annular collar defines a generally circular channel disposed generally concentrically with the opening. The channel has a larger diameter than a diameter of the annular flange. In another variation, the mounting bores are threaded.

In a third embodiment, a tank assembly comprises a gas impermeable liner having a neck that defines a passage. An annular collar having a generally circular collar opening and a raised annular flange disposed generally concentrically with the collar opening is disposed around the neck such that the neck is received in the collar opening. This third embodiment also includes an annular mounting bracket having a generally circular bracket opening. The mounting bracket is rotatably mounted on the collar such that the bracket opening engages the raised annular flange of the annular collar. This third embodiment also includes a structural layer substantially enveloping the liner and securing the collar to the neck.

In an implementation of this third embodiment, the raised annular flange defines a plurality of mounting bores. The tank assembly further comprises a plurality of fasteners, each fastener being secured within a respective one of the mounting bores. The plurality of fasteners are configured to inhibit rotation of the mounting bracket with respect to the raised annular collar. In a variation of this implementation, the raised annular collar defines a substantially circular channel that is disposed substantially concentrically with the collar opening. The channel has a larger diameter than a diameter of the flange. The tank assembly further comprises a sealing member that is disposed within the channel. A bottom surface of the annular mounting bracket engages the sealing member. The bottom surface of the mounting bracket and the sealing member cooperate to provide a gas-tight fit between the annular mounting bracket and an annular collar when the plurality of fasteners engage the mounting bores. In a variation of this implementation, the plurality of mounting bores are threaded, the plurality of fasteners are threaded fasteners that are in threaded engagement with the plurality of mounting bores. In another variation, the sealing member comprises an O-ring.

BRIEF DESCRIPTION OF THE DRAWINGS

The description herein makes reference to the accompanying drawings wherein like reference numerals refer to like parts throughout the several views, and in which.

DETAILED DESCRIPTION OF THE ILLUSTRATED EMBODIMENT(S)

Figure 1:
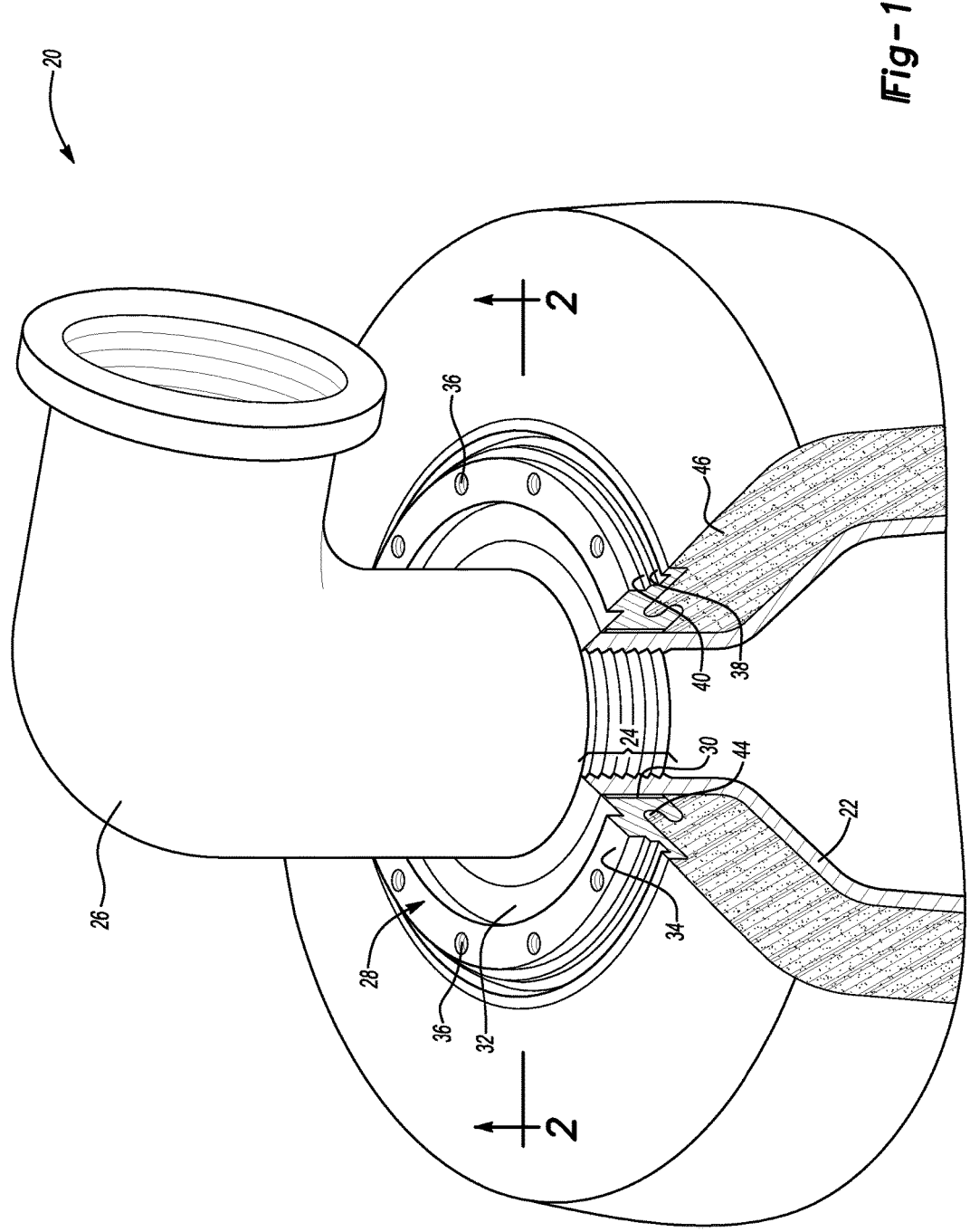
FIG. 1 is a fragmentary perspective view of an embodiment of a tank assembly made in accordance with the teachings of the present invention.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In view of the high pressures at which compressed gases such as hydrogen may be maintained, it may be desirable to reduce the pressure of such compressed gas after the compressed gas has been discharged from the tank assembly in which it is stored. This condition may be accomplished by mounting a regulator close to the outlet/valve of the tank assembly. Mounting the regulator in close proximity to the outlet may eliminate the need for extensive high pressure lines/hoses. Such a mounting condition may reduce leakage from the fuel containment system as well as reduce the cost associated with providing high pressure line/hose.

A conventional tank assembly is configured to receive and store high pressure compressed hydrogen or other gases at pressures up to and exceeding 10,000 psi include a gas impermeable liner made from materials including, but not limited to, plastics, or metal. The liner is enveloped/encased within an outer structural layer that provides the strength to contain the high pressure compressed gas and prevent the liner from rupturing. Conventionally, the structural layer comprises a composite material such as, but not limited to, carbon fiber.

The liner has a neck portion having a diameter that is smaller than a diameter of the remainder of the liner. A valve is mounted to the neck, in some cases through threaded engagement between threads formed on an internal wall of the neck and threads formed on an outer wall of the valve. This arrangement permits the valve to be screwed into position in a bore formed by an internal wall of the neck.

In accordance with the embodiments of the present invention, an annular or ring-like collar is positioned around the neck of the liner prior to, or during, the application of the composite material to the liner. An underside of the collar includes a channel to receive and engage with the strands of the composite material. The liner, collar, and composite material is then heated until the composite material and/or an epoxy resin on the composite material cures, forming a robust casing around the liner and collar.

The collar is further configured to permit attachment of a mounting bracket to the collar. The mounting bracket is configured to receive and retain a regulator or any other device. The mounting bracket is further configured to move with respect to the collar to permit adjustment of the angle and proximity of the regulator with respect to the outlet of the valve of the tank assembly to permit proper alignment and close proximity between the regulator and the valve. In other embodiments, the collar may be placed elsewhere on the liner to permit the mounting of bodies/apparatuses to any desirable portion of the tank assembly.

A greater understanding of the embodiments of the invention disclosed herein may be obtained through a review of the detailed description below as well as a review of the illustrations accompanying this application.

With respect to FIG. 1, an exemplary embodiment of a tank assembly 20 in accordance to one or more embodiments of the present invention is illustrated. Tank assembly 20 may be used to store any type of gas in a compressed state including, but not limited to, hydrogen. Tank assembly 20 may be suitable for use with automobiles including passenger cars, busses and trucks as well as other types of vehicle including, but not limited to, boats, rail driven vehicles, aircraft and spacecraft. Tank assembly 20 is not limited for use with vehicles. Rather, embodiments of tank assembly 20 may be employed in any endeavor or activity where it is desirable to mount bodies or apparatuses such as regulators directly to a tank assembly configured to store compressed gas. Tank assembly 20 may be used to store any type of gas including, but not limited to, hydrogen, in a compressed state at pressures of up to and exceeding 10,000 psi.

Tank assembly 20 includes a liner 22. Liner 22 is a gas impermeable container for containing the compressed gas. Liner 22 may be made of any gas impermeable material including, but not limited to, metal, or plastic. In at least one embodiment, liner 22 may comprise aluminum.

Liner 22 includes a neck 24. Neck 24 has a smaller diameter than the remainder of liner 22 and serves as a pathway for gasses to enter and exit to and from liner 22. Neck 24 defines a central bore and is threaded along an internal wall. The threads of neck 24 are configured to engage corresponding threads defined in an outer surface of a valve 26. The valve 26 generally controls the flow of the gas from the liner 22. While FIG. 1 illustrates that the neck 24 is integrated with the liner 22 to form a single piece, it is contemplated that the neck 24 may be separate from the liner 22. In such an embodiment, the liner 22 may be constructed of plastic and the neck 24 may be constructed of metal.

An annular collar 28 is positioned adjacent an external wall of neck 24. In the illustrated embodiment, annular collar 28 is ring-like structure and defines an internal annular collar bore 30. Annular collar 28 includes a first surface 32 which is substantially flush with an upper surface of neck 24. In other embodiments, the first surface 32 may be disposed above or below an upper surface of neck 24 without departing from the teachings of the present invention.

Annular collar 28 further includes a raised flange 34 adjacent first surface 32 and protruding above first surface 32. Raised flange 34 is generally circular and is generally concentric with internal annular collar bore 30. Raised flange 34 includes a plurality of mounting bores 36 defined in an upper surface thereof. In the illustrated embodiment, mounting bores 36 are threaded and are configured to receive threaded fasteners, discussed below. In other embodiments, a greater or lesser number of mounting bores 36 may be employed without departing from the teachings of the present invention. In still other embodiments, mounting bores 36 may not be threaded.

Annular collar 28 further includes a channel 38 defined in a second surface 40. Channel 38 extends around annular collar 28 in a generally circular configuration and is generally concentric with internal annular collar bore 30 and raised flange 34. In other embodiments, channel 38 may be non-circular and/or non-concentric with raised flange 34 or with internal annular collar bore 30 without departing from the teachings of the present invention. Channel 38 is configured to receive a sealing member 42 (see FIGS. 2-4). In some embodiments, sealing member 42 may comprise an O-ring and may be seated within channel 38. In other embodiments, annular collar 28 may lack channel 38 and second surface 40 may be generally flat. In such embodiments, other types of sealing members, for example, gaskets, may be used without departing from the teachings of the present invention.

Annular collar 28 further includes a retaining channel 44 defined in an underside of annular collar 28. Retaining channel 44 is configured to engage structural layer 46 (as discussed below) and to cooperate with structural layer 46 to retain annular collar 28 in a substantially stationary position with respect to neck 24. Retaining channel 44 generally resembles the letter J in cross-section. In other embodiments, retaining channel 44 may have any other shape or configuration that is conducive to engagement with structural layer 46 and retention of annular collar 28 on neck 24. In the illustrated embodiment, retaining channel 44 extends in circular fashion around an entire underside of annular collar 28. In other embodiments, retaining channel 44 may comprise a plurality of channel segments disposed intermittently around an underside of annular collar 28.

Tank assembly 20 further includes structural layer 46. As illustrated in FIG. 1, structural layer 46 almost completely envelopes liner 22. Structural layer 46 comprises a composite material such as but not limited to, a resin material that includes carbon, gas, or aramid. Structural layer 46 has great strength as compared with liner 22. Structural layer 46 enables tank assembly 20 to receive compressed gasses at pressures up to and exceeding 10,000 psi. In the absence of structural layer 46, liner 22 may rupture when containing compressed gas at such high pressures.

In some embodiments, structural layer 46 may be wrapped around liner 22 by a manufacturing process wherein liner 22 is turned as strands of composite material are wrapped or draped around liner 22. As the strands of carbon fiber are wrapped around the outer portion of neck 24, they enter and engage with retaining channel 44. The wrapping of liner 22 with carbon fiber strands continues until structural layer 46 has reached a desired level of thickness. The greater the pressure of the compressed gas, the thicker will be structural layer 46. Once the desired thickness has been achieved, the tank assembly 20, including the wound strands of structural layer 46, are heated. This causes the carbon fiber strands of structural layer 46 and/or an epoxy or other resin applied thereto to melt and/or bond to form a generally unified, monolithic structure.

Once structural layer 46 is assembled and cured, the only portion of liner 22 that is visible from outside tank assembly 20 is an upper surface of liner 22. Similarly, only an upper portion of annular collar 28 is visible from outside tank assembly 20. The underside, and in particular, retaining channel 44 are hidden from view.

FIGS. 2-6 illustrate the attachment of an annular mounting bracket 48 to annular collar 28. In general, annular mounting bracket 48 enables an enclosure (not shown) to be coupled thereto to vent gas to the exterior of the vehicle. Annular mounting bracket 48 is disposed proximate to, and aligned with, annular collar 28. Annular mounting bracket 48 has a generally annular or ring-like shape having a central circular opening or bore 50 that is configured to generally conform to, and engage with, an outer wall of raised flange 34. As annular mounting bracket 48 is moved onto annular collar 28, valve 26 passes through opening 50. In other embodiments, annular mounting bracket 48 may be attached to annular collar 28 prior to attaching valve 26 to neck 24.

Figure 2:
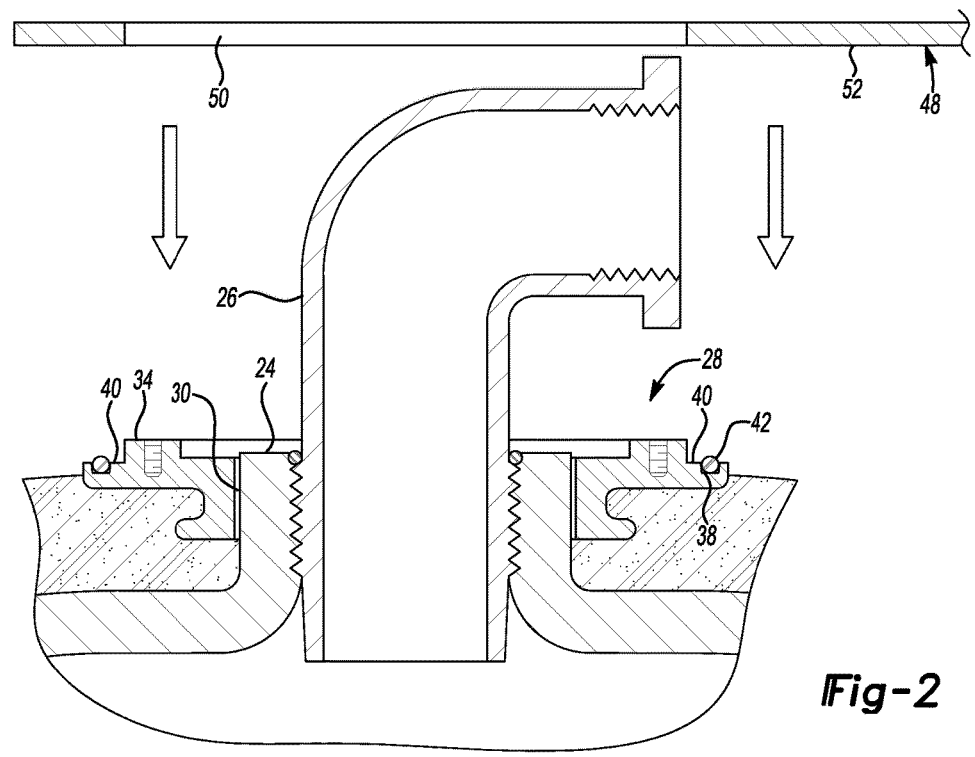
FIG. 2 is a cross-section taken along the line 2-2 of FIG. 1.
Figure 3:
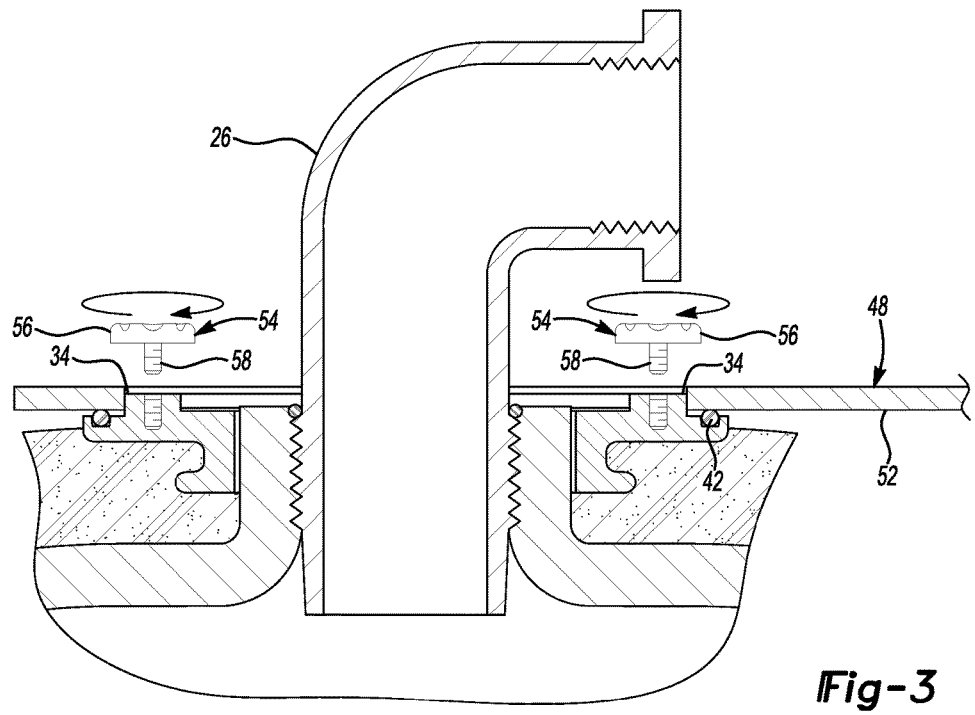
FIGS. 3-5 are cross-sectional views illustrating the attachment of a mounting bracket to the tank assembly of FIG. 2.
Figure 4:
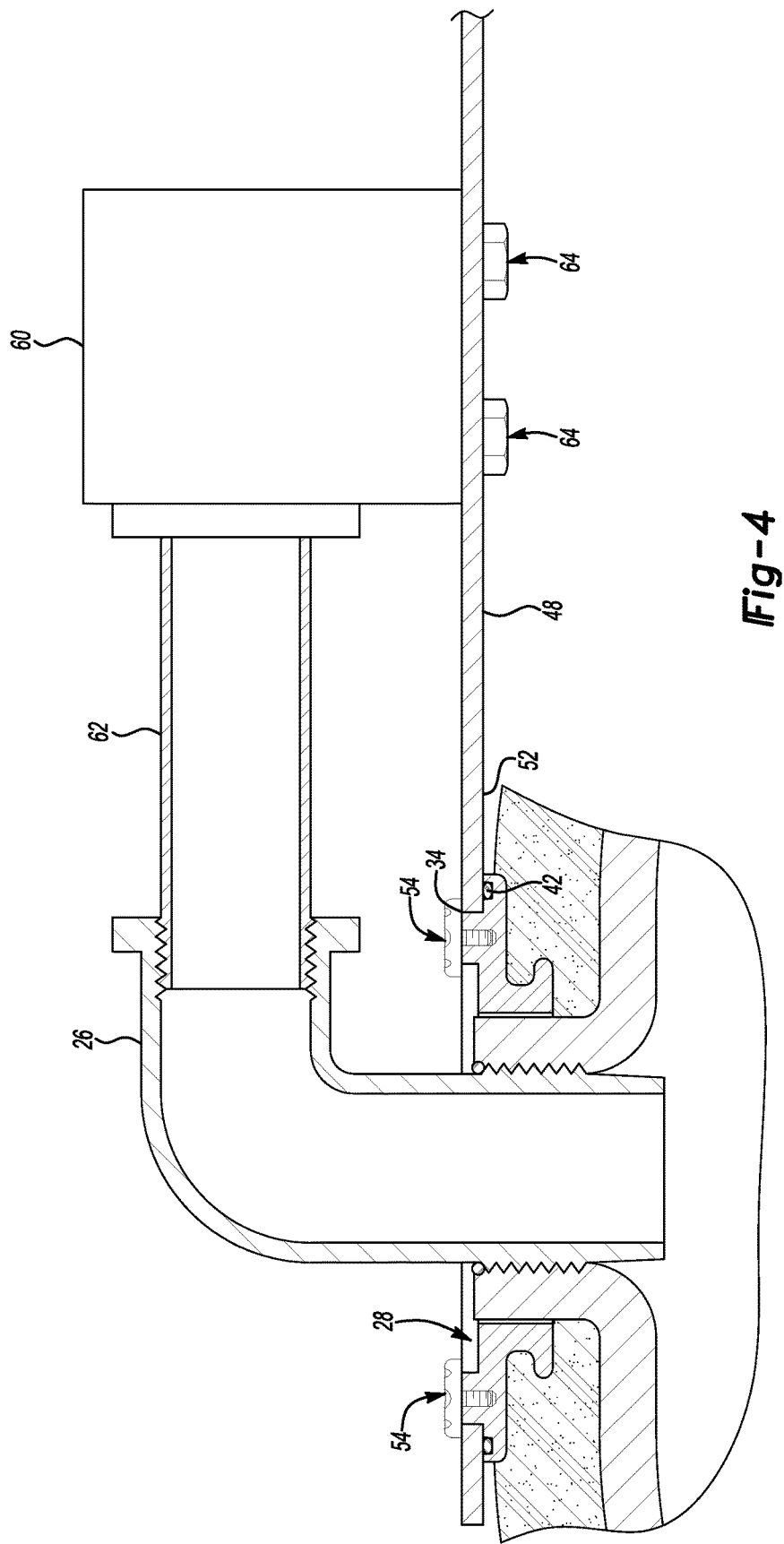

As illustrated FIGS. 2-4, sealing member 42 is positioned within channel 38. In the illustrated embodiment, sealing member 42 is a rubber O-ring. When seated within channel 38, a portion of O-ring 42 protrudes above second surface 40.

With respect to FIG. 4, as annular mounting bracket 48 is lowered onto annular collar 28, a bottom surface 52 of annular mounting bracket 48 engages sealing member 42. The opening 50 of the annular mounting bracket 48 is configured to receive the raised flange 34 (see FIGS. 5-6). With annular mounting bracket 48 positioned such that raised flange 34 is received within opening 50, annular mounting bracket 48 may be rotated about raised flange 34 until oriented in a desired position. Threaded fasteners 54 may then be introduced to engage with some or all of mounting bores 36 (see FIGS. 3-4).

As illustrated, threaded fasteners 54 include a head portion 56 and a threaded portion 58 (see FIG. 3). Head portion 56 has a width that exceeds a width of the upper surface of raised flange 34. An upper surface of annular mounting bracket 48 is disposed slightly above the upper surface of raised flange 34. An underside of head portion 56 will engage the upper surface of annular mounting bracket 48 as threaded fastener 54 is twisted down into mounting bore 36. The underside of threaded fastener 54 will drive annular mounting bracket 48 in a downward direction thereby compressing and retaining annular mounting bracket 48 against sealing member 42. The annular mounting bracket 48 is secured to the annular collar 28 in response the application of the threaded fasteners 54.

Figure 5:
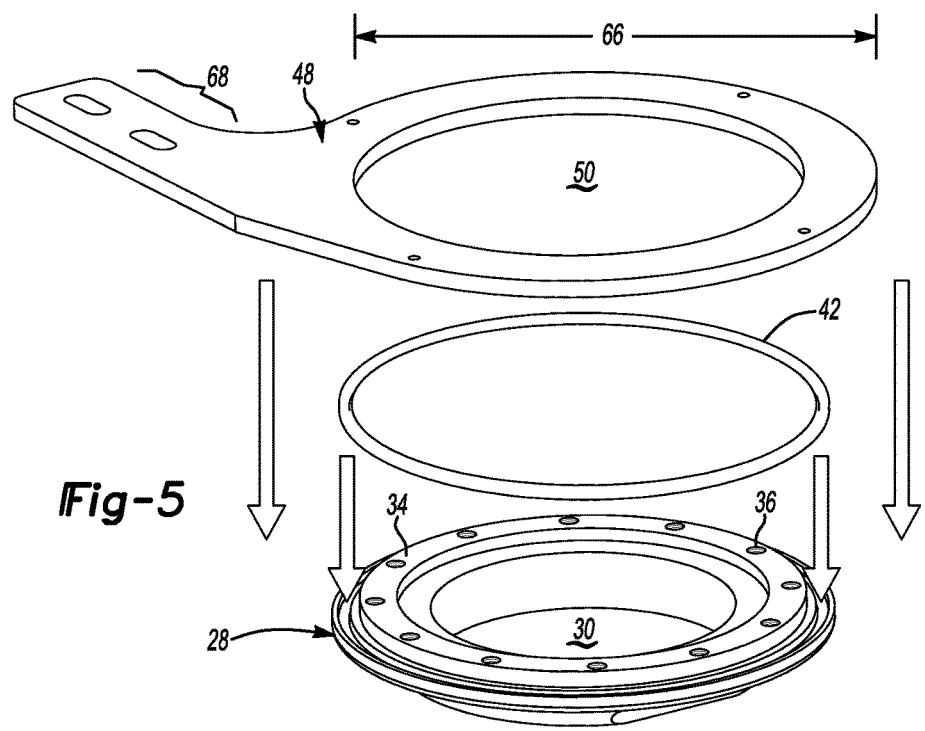

With respect to FIGS. 4-5, when threaded fastener 54 is fully engaged with mounting bore 36, annular mounting bracket 48 is compressed against sealing member 42 and second surface 40 to form a gas-tight seal. With the plurality of threaded fasteners 54 being fully engaged with their respective mounting bores 36, annular mounting bracket 48 is frictionally inhibited from rotation about raised flange 34. The ability to selectively rotate and selectively inhibit rotation of annular mounting bracket 48 permits an assembler to position a regulator 60 in a desired position with respect to valve 26. In the illustrated embodiment, fitting 62 may be needed to connect regulator 60 to valve 26 (see FIG. 4). A high pressure line/hose is generally not needed to facilitate the connection. Regulator 60 may be attached to annular mounting bracket 48 through the use of threaded fastener 64 or through other mechanical means. Regulator 60 regulates the flow of compressed hydrogen from liner 22.

When tank assembly 20 is mounted in the trunk or cargo portion of a vehicle, there is a risk that the compressed gas may leak out of tank assembly 20 and enter the passenger compartment of the vehicle. The manufacturer is required to provide an airtight "vent box" (or enclosure as noted above) to direct such leaked gas to an area outside of the passenger compartment. By providing a sealing member 42 between annular mounting bracket 48 and annular collar 28, an airtight seal is provided that prevents gas from passing between annular collar 28 and annular mounting bracket 48. This permits a manufacturer to design and install the vent box that can attach to annular mounting bracket 48 instead of one which needs to be attached directly to annular collar 28. Various mounting holes as shown on the annular mounting bracket 48 facilitate coupling the vent box thereon. This arrangement can afford a manufacturer greater flexibility when designing the vent box.

With respect to FIG. 5, a perspective view of the alignment and attachment between annular mounting bracket 48 and annular collar 28 is shown. Annular mounting bracket 48 is lowered over annular collar 28 such that the raised flange 34 is received with the opening 50.

Figure 6:
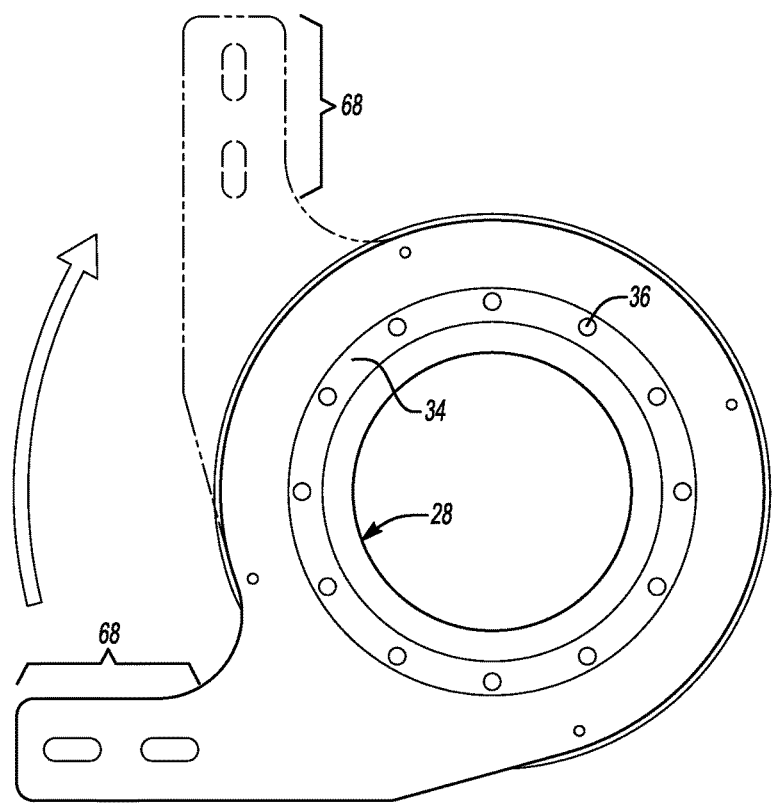
FIG. 6 is a perspective view illustrating the alignment and attachment of a mounting bracket with a collar of the tank assembly of FIG. 1.

As illustrated in FIG. 6, when annular mounting bracket 48 is engaged with raised flange 34, only an upper surface of raised flange 34 is visible from outside of tank assembly 20. Annular mounting bracket 48 may be rotated to any desired angular position about raised flange 34 as indicated in phantom lines. Annular mounting bracket 48 includes an annular portion 66 and a mounting portion 68. Annular portion 66 is configured to engage raised flange 34 and mounting portion 68 is configured to receive and engage regulator 60.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A tank assembly comprising:
a gas impermeable liner having a neck having a threaded bore to receive a valve for providing compressed gas;
an annular collar having a generally circular opening, the annular collar being disposed around the neck;
an annular mounting bracket including a generally circular opening for being rotatably mounted on the annular collar to surround the valve; and
a structural layer substantially enveloping the liner and securing the annular collar to the neck, wherein the annular mounting bracket includes a mounting portion for receiving and securing a regulator thereon, the regulator being in fluid communication with the valve to regulate a flow of the compressed gas therefrom.

2. The tank assembly of claim 1 wherein the annular mounting bracket includes a first end for being rotatably mounted on the annular collar and a second end for receiving the regulator.

3. The tank assembly of claim 2 further comprising a fitting positioned above annular mounting bracket for being coupled to the valve and to the regulator for providing the compressed gas from the valve to the regulator.

4. The tank assembly of claim 3 wherein the fitting includes a threaded portion at one end thereof for engaging the valve.

5. The tank assembly of claim 1 wherein the annular collar includes a raised annular flange for receiving the annular mounting bracket.

6. The tank assembly of claim 5 wherein the raised annular flange defines a plurality of mounting bores, one or more of the plurality of mounting bores being arranged to receive a fastener to secure the annular mounting bracket to the raised annular flange.

7. A tank assembly for a vehicle comprising:
a gas impermeable liner having a neck to receive a valve for providing compressed gas;
an annular collar having a generally circular opening, a first surface, and an annular flange protruding above the first surface and disposed generally concentrically with the opening, the annular collar being disposed around the neck such that the first surface is substantially coplanar with an upper surface of the neck;
an annular mounting bracket including a generally circular opening for being rotatably mounted on the annular collar to surround the valve; and
a structural layer substantially enveloping the liner and securing the annular collar to the neck, wherein the annular mounting bracket includes a mounting portion for receiving and securing a regulator thereon, the regulator being in fluid communication with the valve to regulate a flow of the compressed gas therefrom.

8. The tank assembly of claim 7 wherein the annular mounting bracket includes a first end for being rotatably mounted on the annular collar and a second end for receiving the regulator.

9. The tank assembly of claim 8 further comprising a fitting positioned above the annular mounting bracket for being coupled to the valve and to the regulator for providing the compressed gas from the valve to the regulator.

10. The tank assembly of claim 9 wherein the fitting includes a threaded portion at one end thereof for engaging the valve.

11. A tank assembly comprising:
a liner including a neck having a threaded bore to receive a valve for providing compressed gas;
an annular collar being disposed around the neck;
an annular mounting bracket including a first end for being rotatably mounted on the annular collar and for surrounding the valve and a second end for receiving a regulator; and
a structural layer substantially enveloping the liner and securing the annular collar to the neck.

12. The tank assembly of claim 11 wherein the annular collar includes a raised annular flange for receiving the annular mounting bracket.

13. The tank assembly of claim 12 wherein the raised annular flange defines a plurality of mounting bores, one or more of the plurality of mounting bores being arranged to receive a fastener to secure the annular mounting bracket to the raised annular flange.

14. The tank assembly of claim 11 wherein the annular mounting bracket includes a mounting portion for receiving and securing the regulator thereon, the regulator being in fluid communication with the valve to regulate a flow of the compressed gas therefrom.

15. The tank assembly of claim 14 further comprising a fitting positioned above the annular mounting bracket for being coupled to the valve and to the regulator for providing the compressed gas from the valve to the regulator.

16. The tank assembly of claim 15 wherein the fitting includes a threaded portion at one end thereof for engaging the valve.

* * * * *